JAMES P. CRUTCHFIELD.

Improvement in Fertilizers.

No. 126,933. Patented May 21, 1872.

UNITED STATES PATENT OFFICE.

JAMES P. CRUTCHFIELD, OF FAYETTE CORNER, TENNESSEE.

IMPROVEMENT IN FERTILIZERS.

Specification forming part of Letters Patent No. 126,933, dated May 21, 1872.

Specification describing a new and Improved Manure-Distributer, invented by JAMES P. CRUTCHFIELD, of Fayette Corner, in the county of Fayette and State of Tennessee.

Figure 1:
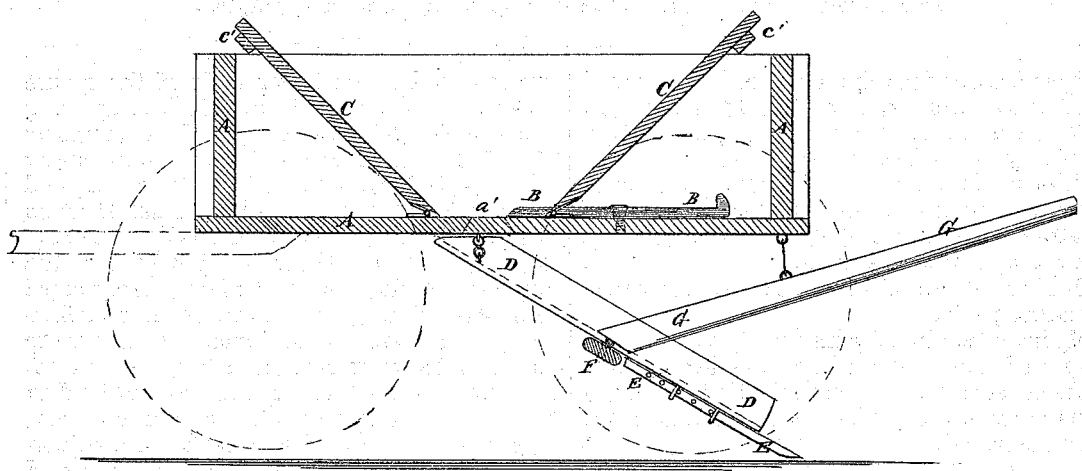
Figure 2:
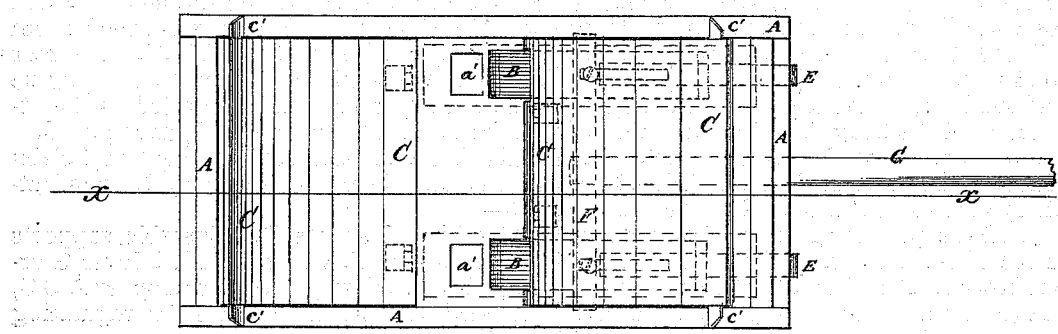

Figure 1 is a detail longitudinal section of my improved manure-distributer, showing it as attached to an ordinary wagon-body. Fig. 2 is a top view of the same.

Similar letters of reference indicate corresponding parts.

My invention has for its object to furnish an improved manure-distributer; and it consists in the construction and combination of the various parts of the device, as hereinafter more fully described.

A represents the body or box of an ordinary wagon, about the construction of which there is nothing new. In the bottom of the body A are formed two holes, $a'$, through which the manure passes to the ground. The holes $a'$ are closed, partly or wholly, when desired, by slides B working along the bottom of the body A. C are boards or partitions, of such a breadth as to fit between the sides of the body A, and the lower edges of which are hinged to the bottom of the body A in front and rear of the holes $a'$, as shown in Figs. 1 and 2. The partitions C are supported in an inclined position by cross-bars $c'$ attached to their upper parts, and the projecting ends of which rest upon the edges of the sides of the body or box A, as shown in Figs. 1 and 2. The partitions C thus form a hopper-shaped space to receive the manure, and from which it is readily shoveled or hoed into the holes $a'$. D are spouts which receive the manure from the holes $a'$ and conduct it into the furrows previously opened in the ground. E are supports which are attached to the lower ends of the spouts D, and the lower ends of which drag along the ground. The upper ends of the supports E pass through keepers attached to the under sides of the lower ends of the spouts D, and are secured in place by pins passed through them. Several holes are formed in the supports E to receive the said pins, so that the supports E may be conveniently lengthened or shortened to give a greater or less inclination to the spouts D to cause the manure to pass out faster or slower, as may be desired. The two spouts D are connected and held in their proper relative positions by a cross-bar, F, to the end parts of which they are adjustably attached, so that they may be adjusted closer together or further apart, according as the furrows, along which they are to be distributed, are closer together or further apart. G is a lever, the forward end of which is pivoted to the center of the cross-bar F, and which is pivoted to the rear end of the bottom of the body A, as shown in Fig. 1. The rear end of the lever G projects so that it may be conveniently grasped and operated by the attendant to guide the spouts D, as required.

Having thus described my invention, I claim as new and desire to secure by Letters Patent—

The hinged spouts D, adjustable supports E, a cross-bar F, and suspended lever G arranged with the wagon-body or hopper A C C, provided with suitable slides for regulating the discharge, as set forth.

JAMES P. CRUTCHFIELD.

Witnesses:
J. F. GATES,
O. L. HAILEY.